E. E. SILK.
FLEXIBLE FLUID JOINT.
APPLICATION FILED JULY 28, 1906.
900,603.
Patented Oct. 6, 1908.
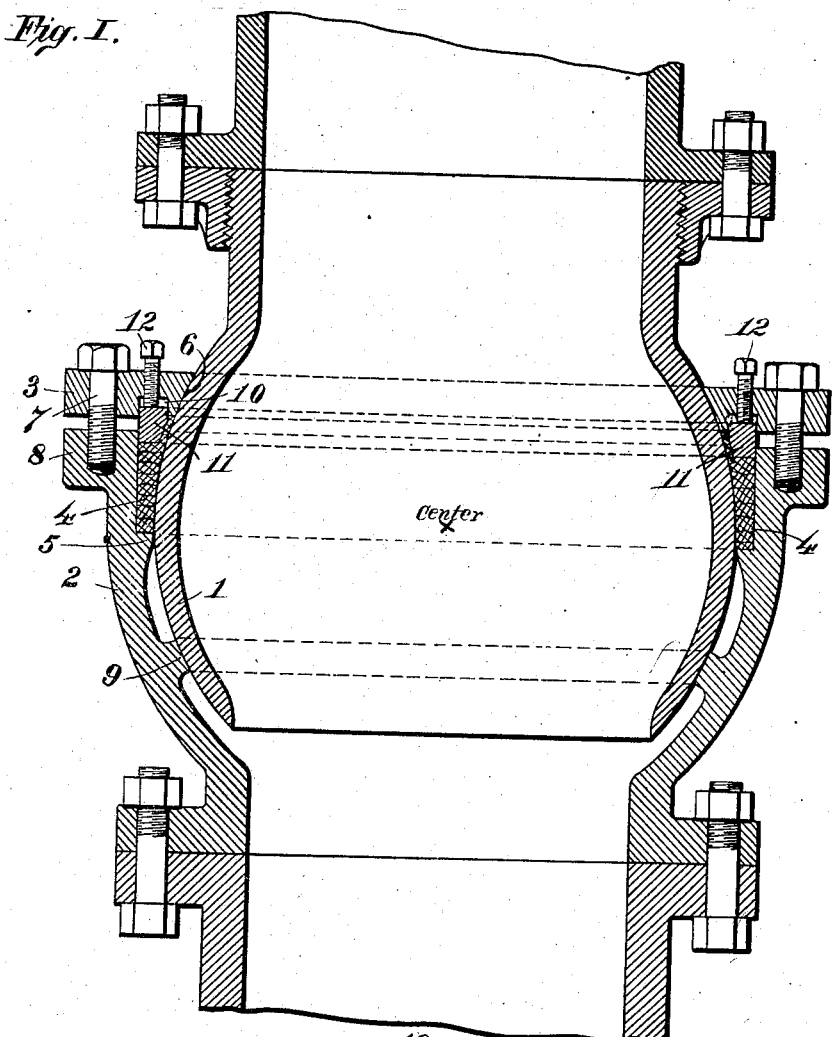
Fig. I.
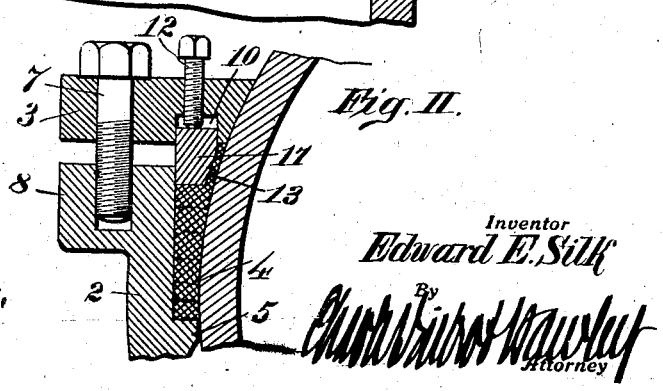
Fig. II.
Witnesses:
Inventor
Edward E. Silk

UNITED STATES PATENT OFFICE.

EDWARD E. SILK, OF CHICAGO, ILLINOIS, ASSIGNOR TO BARCO BRASS AND JOINT COMPANY, OF CHICAGO, ILLINOIS, A CORPORATION OF ILLINOIS.

FLEXIBLE FLUID-JOINT.

No. 900,603.

Specification of Letters Patent.

Patented Oct. 6, 1908.

Application filed July 23, 1906. Serial No. 328,269.

*To all whom it may concern:*

Be it known that I, EDWARD E. SILK, of Chicago, in the county of Cook and State of Illinois, have invented a certain new, useful, and Improved Flexible Fluid-Joint, of which the following is a full, clear, and exact description, such as will enable others skilled in the art to which it appertains to make and use the same.

My invention relates to improvements in flexible joints for pipes, and particularly for pipes of large diameter.

The object of my invention is to provide a flexible joint for fluid conveying pipes, especially for those of a large diameter, in which all engaging and holding surfaces shall be metallic and which shall be tight whether under high or low pressure.

A further and particular object of my invention is to provide a joint of the class mentioned with a tightly closed packing pocket, and to equip the same with means for compressing the packing therein without altering the adjustment of the metallic parts, and without permitting the packing to escape therefrom by passing about the compressing member.

A further object of my invention is to provide a joint of the class mentioned with means for taking up the wear incident to usage.

With these objects in view, my invention consists in a ball and socket joint for fluid conveying pipes, comprising a ball member and a two-part socket member, a packing pocket in one part of said socket member, preferably extending inwardly to a plane beyond the center of the socket and a metallic closure closing the joint or opening between the parts of the socket member, and adapted to both retain the soft packing in the pocket and compress it therein.

My invention further consists in various details of construction, and in combinations of parts, all as described in detail hereinafter and particularly pointed out in the appended claims.

My invention will be more readily understood by reference to the accompanying drawings forming a part of this specification, and in which Figure I is a sectional view of a fluid joint embodying my invention. Fig. II is an enlarged detail view illustrating, on an enlarged scale, the packing and packing pocket together with the metallic closure.

Referring to the drawings, 1 indicates the ball member, and 2, 3, the two-part socket member. The part 2 of the socket member is provided with an annular packing pocket 4, extending inwardly to a plane beyond the center of the socket. The bottom of the pocket 4 is defined by an annular flange or rib 5. This rib contacts the ball member 1, effectually closing the bottom of the pocket 4. As the center of the ball is above the plane of the flange 5, the flange contacts the ball upon a small circle of the sphere. Consequently, as the ball is moved inwardly to take up the wear, it presents constantly increasing circles to the rib 5. This takes up all wear at that point, and maintains a tightly closed joint at the bottom of the packing pocket.

The part, 3, of the pocket comprises a stout ring having its inner edge finished as at 6 to form a seat for the ball member 1. It is provided with a number of bolt holes, for the accommodation of bolts 7, which pass therethrough and into a flange 8 formed on the part 2. It will be seen that all the wear is upon metallic surfaces, as the ball is held between the seat 6 of the part 3 and a seat 9 formed in the bottom of the part 2; and also that the wear may be readily taken up by tightening the bolts 7. The face of the part 3, which is contiguous to the part 2, is provided with an annular groove, 10, of an outside diameter equal to that of the packing pocket 4. Within the groove 10, is seated a ring 11, which bridges the gap between the socket member and the follower, and extends into the said packing pocket. Thus, it will be seen, by reference to the drawings that the packing is confined between the outer walls of the pocket 4, the flange 5, the ring 11, and a small portion of the part 3 of the socket member. A plurality of screws 12 are tapped through the part 3 and impinge against the upper face of the ring 11. By tightening the screws 12 the ring 11 is pressed inwardly upon the packing, tightly wedging the same in the pocket. The lower, inner edge of the ring 11 is beveled as indicated at 13, to prevent it from impinging against the ball member 1, when pressed inwardly. It should be noticed that there is no possible way for the packing or any portion thereof to escape from the pocket, so long as the upper edge of the ring, 11, remains in the groove, 10. This is true no matter how great the pressure which is applied through the ring, 11, and screws 12. It is also to be noted that all strain tending to separate the joint is upon the metallic parts only, and that none of it is upon the soft packing or upon non-metallic gaskets, as is frequently the case with joints of this character now in use. This particular flexible joint may be modified without departing from my invention, and I do not confine the invention to the specific connection herein shown and described.

Having thus described my invention, I claim as new and desire to secure by Letters Patent:

1. In a flexible fluid joint for pipes, a ball member in combination with a two part socket member, said socket member being provided with a packing pocket extending inwardly to a plane beyond the center of the socket, a metallic closure arranged in the outer end of the pocket and closing the joint between the parts of the socket member, and means for forcing said metallic closure into said pocket, substantially as described.

2. In a flexible fluid joint for pipes, a ball member in combination with a two part socket member, a packing pocket in one part of said socket member, an annular recess in the other part thereof, a metallic closure arranged in said annular recess and extending into said pocket to close the joint or opening between the parts of said socket member, and means for forcing said metallic closure into said pocket, substantially as described.

3. In a flexible pipe, a ball member, in combination with a socket member, comprising relatively adjustable parts; said socket parts together containing a packing recess and an adjustable metallic packing-follower, arranged in said recess, and closing the joint between the parts of the socket member, substantially as described.

In testimony whereof, I have hereunto set my hand, this 29th day of May, 1906, in the presence of two subscribing witnesses.

EDWARD E. SILK.

Witnesses:
CHARLES GILBERT HAWLEY,
JOHN R. LEFEVRE.